No. 628,285. Patented July 4, 1899.
D. J. REAUME.
COMBINED TAP COUPLING AND VALVE.
(Application filed June 23, 1898.)
(No Model.)
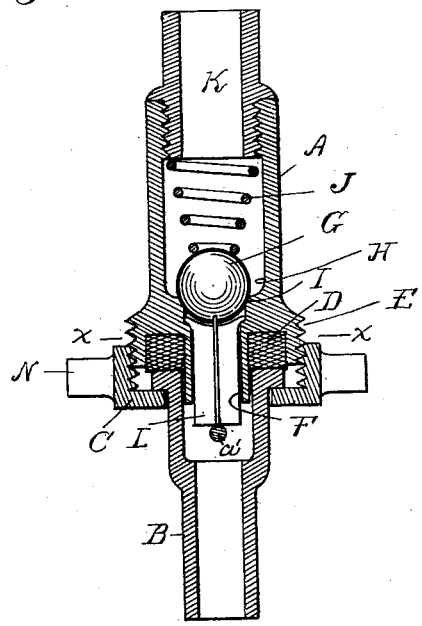
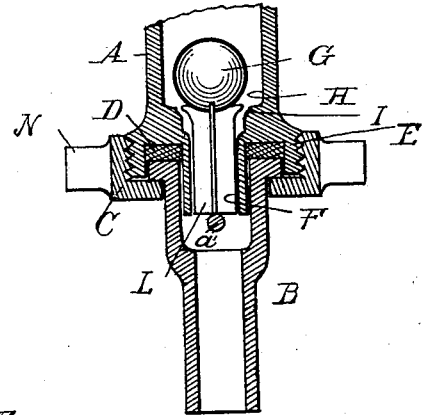
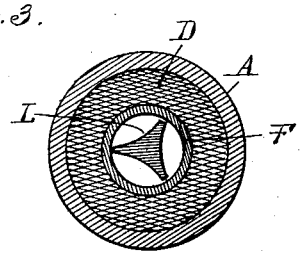
Inventor
Denis J. Reaume

UNITED STATES PATENT OFFICE.

DENIS J. REAUME, OF DETROIT, MICHIGAN.

COMBINED TAP-COUPLING AND VALVE.

SPECIFICATION forming part of Letters Patent No. 628,285, dated July 4, 1899.

Application filed June 23, 1898. Serial No. 684,267. (No model.)

*To all whom it may concern:*

Be it known that I, DENIS J. REAUME, a citizen of the United States, residing at Detroit, in the county of Wayne and State of Michigan, have invented certain new and useful Improvements in a Combined Tap-Coupling and Valve, of which the following is a specification, reference being had therein to the accompanying drawings.

The invention consists in the peculiar construction of a tap-coupling provided with a valve adapted to automatically close when the pipe-sections are uncoupled and to be opened by the coupling of said sections, as more fully hereinafter described and claimed.

In the drawings, Figure 1 is a central longitudinal section through my tap-coupling with the valve closed. Fig. 2 is a similar view with the valve shown opened, and Fig. 3 is a cross-section on line $x$ $x$.

My coupling is similar in construction to an ordinary pipe-union, comprising the pipe-sections A and B and the coupling-sleeve C, the latter being swiveled upon the section B and having a screw-thread engagement with the section A.

D is an elastic packing ring or gasket placed between the sections A and B, preferably in an annular recess in the section A, formed by the exterior annular flange E and the inner concentric tube F, the latter projecting beyond the gasket and telescoping into the section B.

G is a check-valve in the section A, preferably a ball-valve in an enlarged chamber H in this section, and having a seat I, against which it is normally held by spring J abutting against a shoulder formed by a nipple or section K.

L is an arm for unseating the valve G, preferably a winged pin in the tube F, one end of which is adapted to bear against the valve and the other end against the cross-pin $a'$ in the section B, said pin $a'$ constituting a stop.

In practice, the nipple K being connected to the supply-pipe and the section B to the discharge-pipe, whenever the sections are uncoupled the valve G will be held to its seat by the spring J and the pressure of liquid in the chamber H.

In coupling the sleeve C is engaged with the threaded end of the section A and turned by means of handles N thereon pressing the end of the section B against the elastic gasket D. As soon as the joint is made the winged pin L will bear against the ball G, and upon a further turning of the sleeve will unseat said valve, the elastic gasket D being compressed to permit of this further movement. In uncoupling the sleeve is turned in the reverse direction, allowing the gasket to expand and the valve to reseat before the sections are separated. It is not, however, necessary to uncouple the sections in order to close the valve, as there is sufficient elasticity in the gasket to maintain a tight joint while the valve is moving toward or from its seat. Thus the device performs a double function of a coupling and a valve which may be readily opened or closed.

What I claim is—

1. The combination of the pipe-sections A and B, the coupling-sleeve C swiveled on the section B, and having a screw-threaded engagement with the section A, the concentric flanges E and F on the section A, the elastic gasket G in the annular recess between said flanges, the ball check-valve seated in the section A and the arm L for the purpose described.

2. A combined coupling and valve comprising two pipe-sections, a coupling-sleeve for drawing the said sections together, an elastic gasket between the adjacent ends of said sections, a single valve and a valve-actuating arm independent of the valve carried by one section, and a device for unseating the valve, rigidly secured within the other section, said device being adapted to abut against the arm upon the movement together of the sections sufficient to compress the gasket.

3. A combined coupling and valve comprising two pipe-sections, a coupling-sleeve for drawing the sections together, said sleeve being constructed to abut against one section and to engage with the other, an elastic gasket between the adjacent end sections, a valve in one section, a triangular valve-block carried by said section independent of the valve, and a stop rigidly secured within the other section adapted to abut against the block and unseat the valve, upon the movement together of the sections sufficiently to compress the gasket.

In testimony whereof I affix my signature in presence of two witnesses.

DENIS J. REAUME.

Witnesses:
M. B. O'DOGHERTY,
OTTO F. BARTHEL.